(12) United States Patent
Massimo

(10) Patent No.: US 9,517,724 B2
(45) Date of Patent: Dec. 13, 2016

(54) ACOUSTIC SIGNALING SYSTEM FOR ELECTRIC OR HYBRID VEHICLES

(71) Applicant: META SYSTEM S.P.A., Reggio Emilia (IT)

(72) Inventor: Zenobi Massimo, Reggio Emilia (IT)

(73) Assignee: META SYSTEMS S.P.A., Reggio Emilia (IT)

( * ) Notice: Subject to any disclaimer, the term of this patent is extended or adjusted under 35 U.S.C. 154(b) by 0 days.

(21) Appl. No.: 14/648,872

(22) PCT Filed: Dec. 2, 2013

(86) PCT No.: PCT/IB2013/060565
§ 371 (c)(1),
(2) Date: Jun. 1, 2015

(87) PCT Pub. No.: WO2014/087319
PCT Pub. Date: Jun. 12, 2014

(65) Prior Publication Data
US 2015/0314726 A1 Nov. 5, 2015

(30) Foreign Application Priority Data

Dec. 4, 2012 (IT) .............................. MO2012A0300

(51) Int. Cl.
*B60Q 1/22* (2006.01)
*B60Q 5/00* (2006.01)
(Continued)

(52) U.S. Cl.
CPC .............. *B60Q 5/008* (2013.01); *B60R 25/104* (2013.01); *G08B 13/2491* (2013.01); *G08B 21/22* (2013.01)

(58) Field of Classification Search
CPC ............................. B60Q 5/008; G08B 13/2491
(Continued)

(56) References Cited

U.S. PATENT DOCUMENTS

| | | | |
|---|---|---|---|
| 5,210,521 A | 5/1993 | Hojell et al. | |
| 5,635,903 A * | 6/1997 | Koike | A63H 17/34 340/384.1 |

(Continued)

FOREIGN PATENT DOCUMENTS

| | | |
|---|---|---|
| EP | 2 468 176 A2 | 6/2012 |
| FR | 2 956 844 A1 | 9/2011 |

OTHER PUBLICATIONS

International Search Report, dated Apr. 15, 2014, from corresponding PCT application.

*Primary Examiner* — Tai Nguyen
(74) *Attorney, Agent, or Firm* — Young & Thompson

(57) ABSTRACT

The acoustic signaling system for electric, hybrid vehicles or the like, which can be installed on an electric vehicle or the like, includes:
  an amplifier device of a piloting signal;
  an electroacoustic transducer device operatively connected to the amplifier device;
  a supervision unit operatively connected to a control device installed on the electric vehicle;
  a digital audio processor operatively connected to the supervision unit and to the amplifier device;
  wherein the supervision unit has elements for sending a command signal to the digital audio processor according to a check signal sent by the control device;
  wherein the digital audio processor has selection elements suitable for selecting one between at least two different audio files, according to the command signal received;
  and wherein the digital audio processor has processing elements suitable for producing the piloting signal starting from the audio file selected.

13 Claims, 4 Drawing Sheets

(51) Int. Cl.
*B60R 25/104* (2013.01)
*G08B 13/24* (2006.01)
*G08B 21/22* (2006.01)

(58) Field of Classification Search
USPC ............ 340/463, 466, 384.3, 435, 438, 692; 381/61, 86
See application file for complete search history.

(56) References Cited

U.S. PATENT DOCUMENTS

| | | | |
|---|---|---|---|
| 8,204,243 B2* | 6/2012 | Smith | B60Q 5/008 340/463 |
| 8,665,081 B2* | 3/2014 | Yoshino | B60Q 1/22 340/463 |
| 8,730,020 B2* | 5/2014 | Konet | B60Q 5/008 340/384.1 |
| 8,955,455 B2* | 2/2015 | Tanaka | B60Q 5/008 116/28 R |
| 2002/0070879 A1 | 6/2002 | Gazit et al. | |
| 2013/0002870 A1 | 1/2013 | Cieler et al. | |

* cited by examiner

ACOUSTIC SIGNALING SYSTEM FOR ELECTRIC OR HYBRID VEHICLES

TECHNICAL FIELD

The present invention relates to an acoustic signaling system for electric, hybrid vehicles or the like.

BACKGROUND ART

Though the considerable advantage cannot be denied in terms of reduction in acoustic pollution due to the increasingly more widespread use of electric vehicles, in particular inside urban centers, it has nevertheless been proved that this also results in a greater risk of accidents involving cyclists and pedestrians, especially if these are visually handicapped and deaf, due to the lack of noises distinctly audible when the vehicle approaches.

To overcome such drawback, the use is known of suitable proximity acoustic signaling devices installable on electric vehicles.

The acoustic signaling devices of known type come into operation when the electric vehicle is running and moves within a predefined speed range, generally between 0 and 30 km/h, and emit a sound easily recognizable by a pedestrian or by a cyclist in the proximity of the vehicle.

In particular, the sound produced can vary according to the speed of the electric vehicle and can be configured according to the type, model or brand of the specific electric vehicle on which the acoustic signaling device is installed. Normally, the acoustic signaling devices of known type are directly connected to the control unit of the electric vehicle by means of a conventional CAN-bus and comprise an amplifier connected to a specific loudspeaker, suitably optimized to modulate and propagate the warning acoustic signal so this is distinctly audible at a predefined distance from the vehicle.

The acoustic signaling devices of known type have, however, a number of drawbacks.

In particular, such acoustic signaling devices in any case represent a further electronic device to be installed on board electric vehicles, in addition to other numerous systems and devices normally present on the vehicle, such as, e.g., anti-theft systems and parking-assistance systems.

This increases the overall complexity of the electronic control systems installed on the vehicle and also represents a further cost, both in terms of the intrinsic costs of the acoustic signaling device and of installation, configuration and maintenance costs of the signaling device itself.

DESCRIPTION OF THE INVENTION

The main aim of the present invention is to provide an acoustic signaling system for electric, hybrid vehicles or the like able to signal in an efficient way the presence of an electric vehicle by means of a simple, rational, easy, effective to use and low cost solution.

The above objects are obtained by the proposed acoustic signaling system for electric, hybrid vehicles or the like, according to claim 1.

BRIEF DESCRIPTION OF THE DRAWINGS

Other characteristics and advantages of the present invention will become more evident from the description of a preferred, but not sole, embodiment of an acoustic signaling system for electric, hybrid vehicles or the like, illustrated purely as an example but not limited to the annexed drawings in which.

EMBODIMENTS OF THE INVENTION

With particular reference to such figures, globally indicated by S is an acoustic signaling system installable on electric vehicles, hybrid vehicles or the like. Advantageously, the system S can be used on an electric vehicle V both as an anti-theft and anti-break in system, and for processing and producing a warning acoustic signal during the movement of the electric vehicle V, in order to indicate its presence.

Consequently, the system S is extremely advantageous inasmuch as it integrates within the same system both the typical functions of an alarm signaling system in the event of an attempt at theft/break-in, and functions of proximity acoustic signaling of the electric vehicle V.

Furthermore, the system S is able to perform such double acoustic alarm and proximity signaling function by means of a single acoustic signaling device L. Preferably, such acoustic signaling device L is composed of an alarm siren of the type conventionally used in anti-theft/anti-break in systems for vehicles. Consequently, compared to the solutions of known type, wherein the presence is normally envisaged of an alarm siren and of an acoustic signaling device controllable by an anti-theft/anti-break in system and by a vehicle proximity signaling system respectively, both installed on the electric vehicle, the use of a single system and of a single acoustic signaling device L for both functions permits considerably reducing both the total intrinsic costs and the times and complexity of installation.

Figure 1:
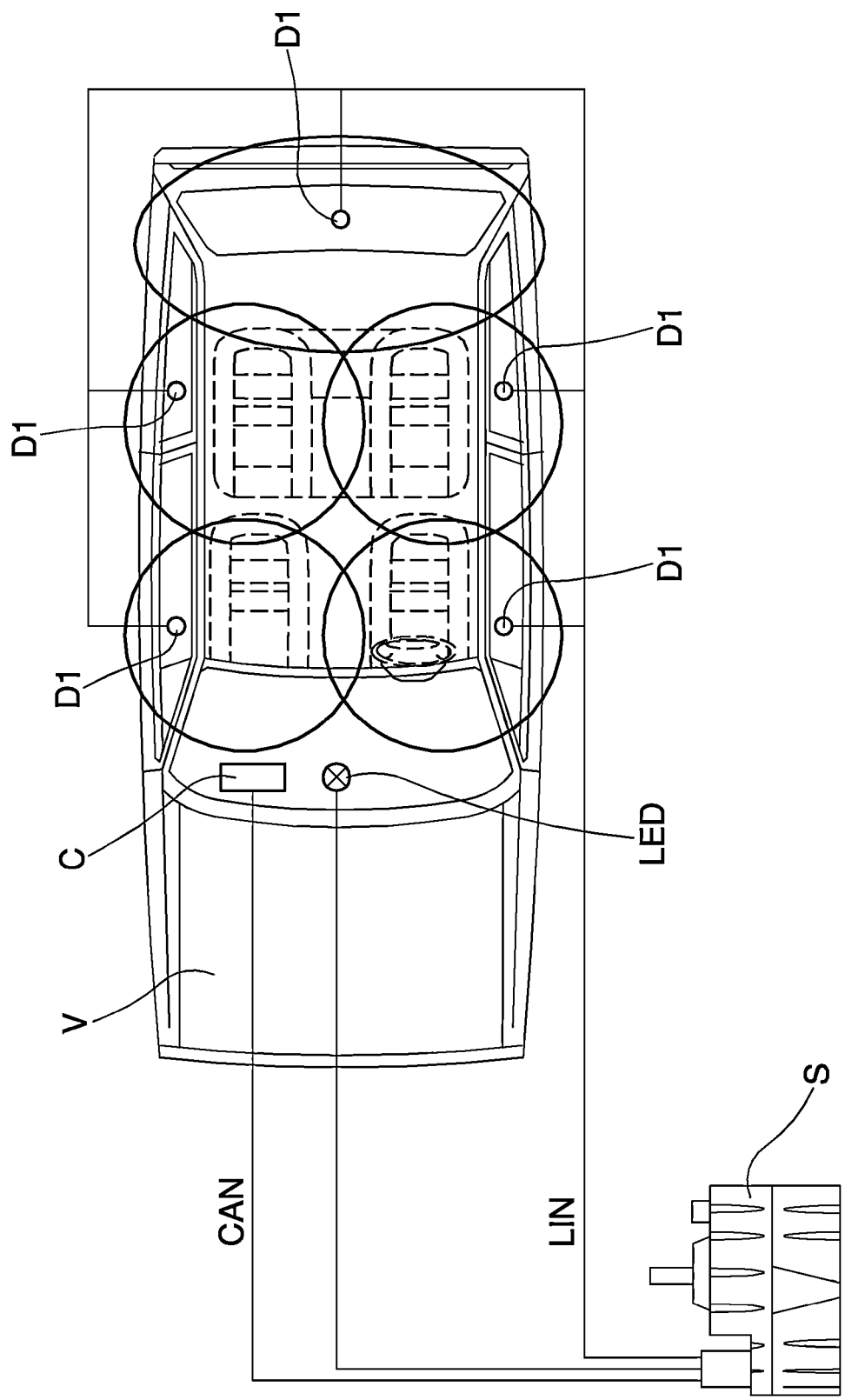
FIG. 1 schematically shows the application on a vehicle of the acoustic signaling system according to the invention.
Figure 2:
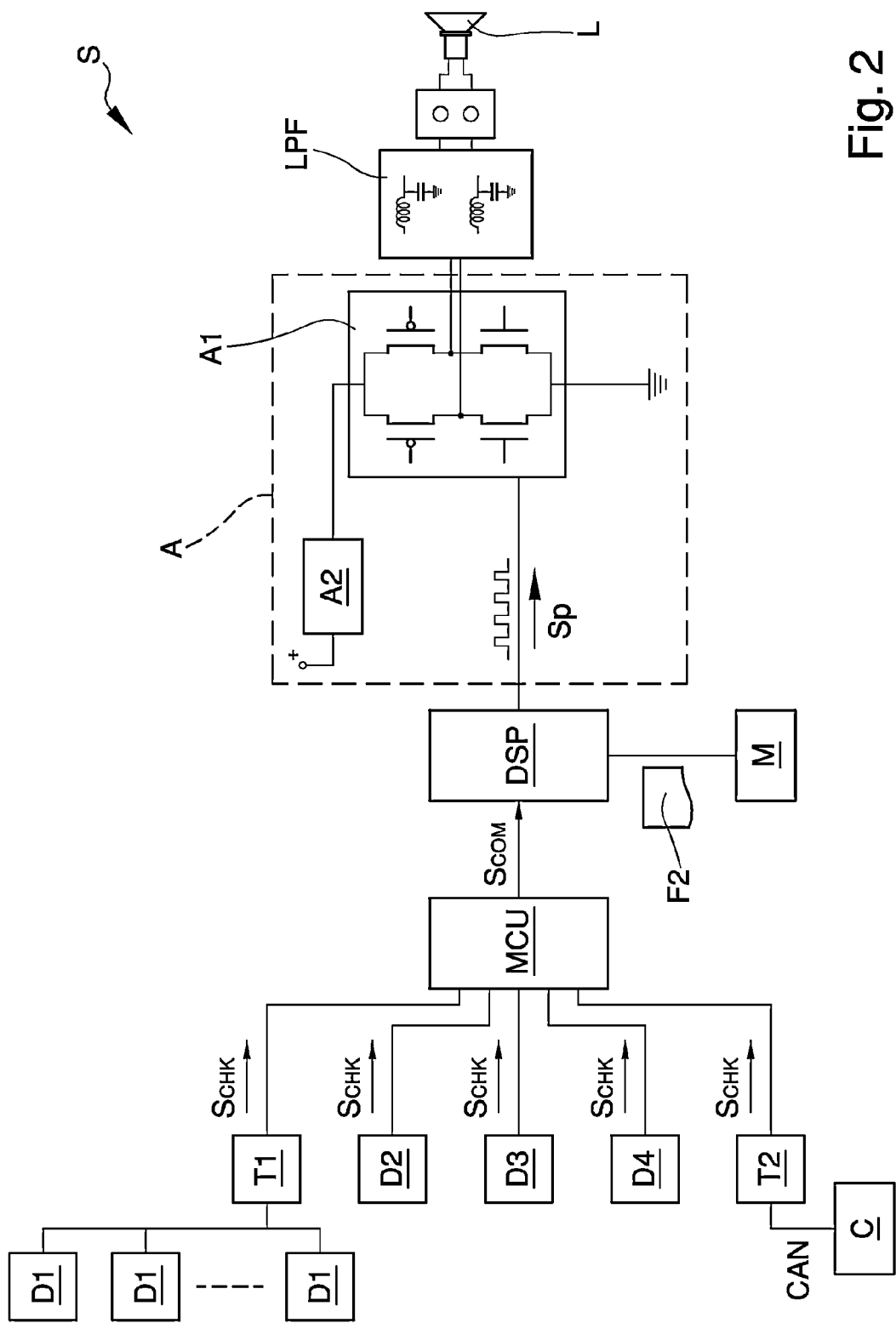
FIG. 2 is a general block diagram of the acoustic signaling system according to the invention.

A general block diagram relating to a particular embodiment of the system S is shown in FIG. 2 and described below.

The system S comprises an amplifier device A suitable for producing a piloting signal $S_P$ of an electroacoustic transducer device L.

In particular, the electroacoustic transducer device L is preferably composed of a piezoelectric loudspeaker able to work within an ample frequency range (e.g., between 250 Hz and 3.3 kHz).

The use cannot however be ruled out of a different electroacoustic transducer device L such as, e.g., a neodymium speaker or a similar device.

Figure 4:
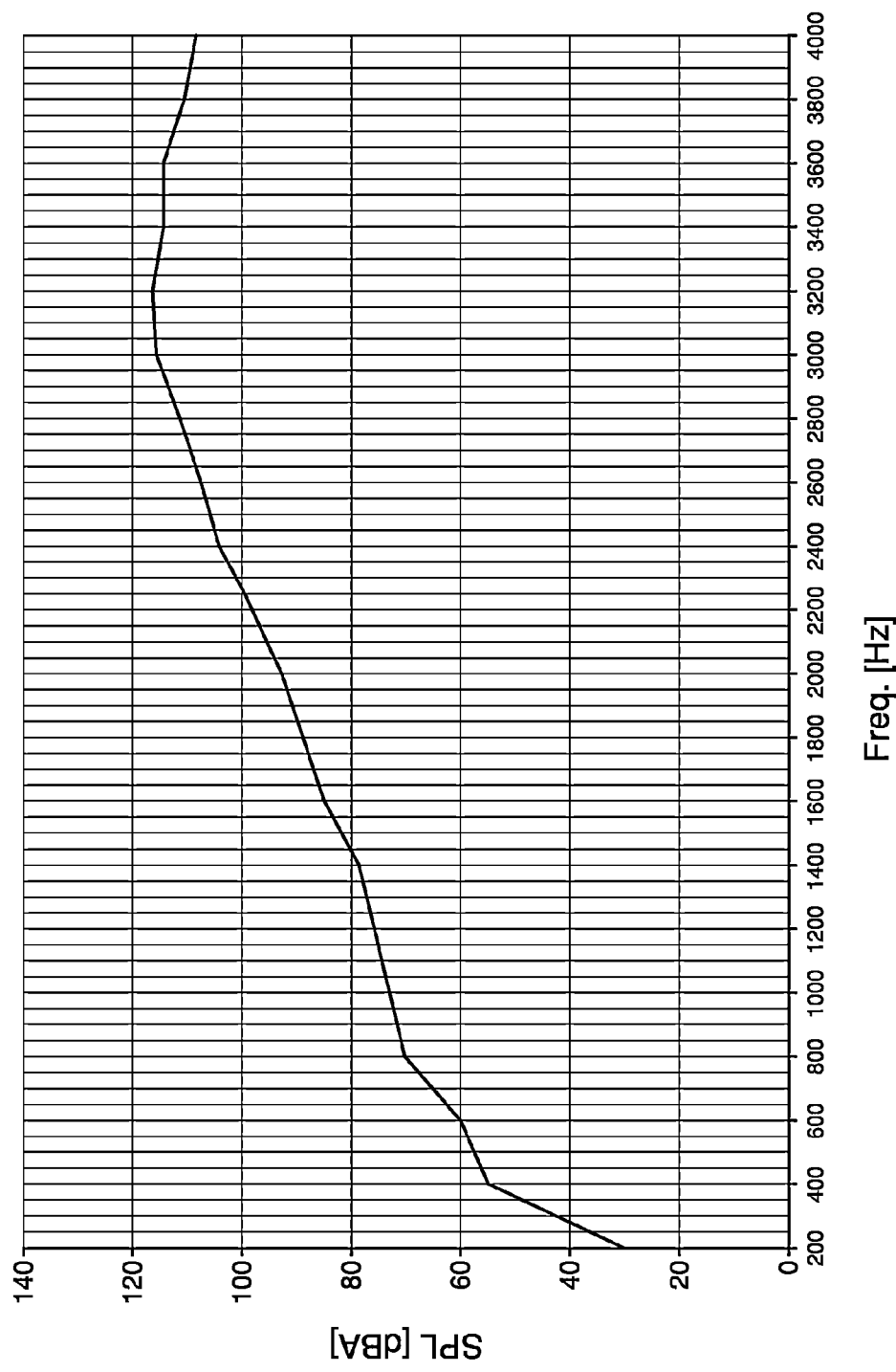
FIG. 4 shows a possible SPL/frequency characteristic of a piezoelectric loudspeaker of the acoustic signaling system according to the invention.

By way of example, FIG. 4 shows a possible SPL/frequency characteristic of a piezoelectric loudspeaker L usable in the system S according to the invention. The system S also comprises a supervision unit MCU operatively connected to one or more control devices D installed on the electric vehicle V.

The supervision unit MCU is preferably composed of a micro controller. Furthermore, the control devices D can be of the type of electronic devices normally installed on board a vehicle and connected to the electric control unit of the vehicle itself and/or electronic devices normally used in anti-theft and anti-break in systems for vehicles.

The control devices D can be composed of one or more anti-theft or anti-break in devices, e.g., of the presence sensors type D1, such as microwave sensors or infrared sensors suitably fitted in the interior compartment of the electric vehicle.

In particular, each presence sensor D1 can be connected to the micro controller MCU of the system S by means of a conventional LIN (Local Interconnect Network) bus installed on the electric vehicle V.

In this case, a transceiver T1 is placed between the LIN bus and the micro controller MCU and is suitable for interfacing the micro controller itself with the presence detectors or, in any case, with the alarm unit of an anti-theft/anti-break in system installed on the electric vehicle V.

The micro controller MCU can be connected to different control devices D such as, e.g.:
- a disconnected battery detection sensor D2 suitable for detecting whether or not a power connection exists to the battery of the electric vehicle V;
- an inclination sensor D3 suitable for detecting, e.g., any changes in the inclination of the electric vehicle in case of attempted theft of the rims or of trailing the vehicle itself;
- a management and diagnostics device D4 connected to a signaling LED of the anti-theft/anti-break in system and suitable for managing and checking the correct operation of the LED.

The connection of the micro controller MCU cannot be ruled out to different control devices D such as, e.g., a device for detecting the position of the electric vehicle V, a sensor for detecting the start up of the motor of the electric vehicle V or similar devices.

Usefully, the micro controller MCU of the system S can be connected to the electronic control unit C of the electric vehicle V to receive information relating to the use of the vehicle such as, e.g., the state of vehicle running/stop, the vehicle running speed, whether the motor starts or not.

In particular, the control unit C can be connected to the micro controller MCU of the system S by means of a conventional CAN (Controller Area Network) bus installed on the electric vehicle V.

In this case, a transceiver T2 is placed between the CAN bus and the micro controller MCU and is suitable for interfacing the micro controller itself with the electronic control unit C.

The system S also comprises a storage unit M suitable for storing a plurality of different audio files.

In particular, the storage unit M can be implemented by means of one or more flash memories, while the stored audio files can be coded in the WAY audio format.

The use cannot however be ruled out of different types of memories and of different audio file code formats.

Advantageously, the audio files are selected between:
- at least a first audio file F1 relative to an alarm audio signal suitable for signaling an attempted theft of the electric vehicle V and/or an attempted break into the interior compartment of the electric vehicle V, when the vehicle is stopped;
- at least a second audio file F2 relative to a proximity warning audio signal suitable for signaling the approach of the electric vehicle V, when the vehicle is running.

The use cannot however be ruled out of several audio files F1 relating to different alarm audio signals and several audio files F2 relating to different proximity warning signals and suitable for signaling different alarm situations and different ways of using the electric vehicle V during driving, respectively. For example, a first audio file F1' can be provided relating to an alarm audio signal in conformity with the standards defined in the U.S.A. and a second audio file F2" relating to an alarm audio signal in conformity with the standards defined by the ECE (Economic Commission for Europe).

The use cannot however be ruled out of audio files of different types, having different functions and usable for signaling different operations.

In particular, further sound signaling audio files can be provided suitable for signaling to the user of the electric vehicle V the performance of particular operations such as, e.g., the activation/deactivation of the alarm system.

The system S comprises a digital audio processor DSP operatively connected to the micro controller MCU, to the storage unit M and to the amplifier device A. In particular, the micro controller MCU has means for sending a command signal $S_{COM}$ to the digital audio processor DSP, wherein such command signal $S_{COM}$ is determined by the micro controller MCU according to one or more check signals $S_{CHK}$ sent by one or more of the control devices D or by the electronic control unit C.

The digital audio processor DSP has:
- selection means suitable for selecting one or more audio files F1 or F2 according to the type of command signal $S_{COM}$ received;
- processing means suitable for producing said electric piloting signal $S_P$ starting from the audio file F1 or F2 selected.

Different embodiments of the digital audio processor DSP cannot however be ruled out.

For example, the digital audio processor DSP can be provided with a synthesis algorithm of the audio files F1 or F2 (or of any other audio files) according to the type of command signal $S_{COM}$ received.

Consequently, in this case, the audio files to be reproduced will not be stored directly inside the storage unit M but, for example, specific parameters can be stored usable by the synthesis algorithm of the digital audio processor DSP to produce the audio files.

In particular, the means for sending the command signal $S_{COM}$ of the micro controller MCU and the selection means and the processing means of the digital audio processor DSP can be realized by means of one or more software programs or hardware devices implemented inside the micro controller MCU, the digital audio processor DSP or the memories linked to these, respectively. In a first possible situation, e.g., the check signal $S_{CHK}$ received by the micro controller MCU can consist of an alarm signal sent by one of the presence sensors D1 in case of undesired breaking into the interior compartment of the electric vehicle V, when the vehicle is stopped and the anti-theft/anti-break in system is on.

In such case, the sending means of the micro controller MCU send the digital audio processor DSP a command signal $S_{COM}$ able to indicate that an alarm audio signal F1 must be reproduced.

Consequently, the selection means of the digital audio processor DSP select and recover from the storage unit M the audio file corresponding to an alarm audio signal F1.

Subsequently, the processing means of the digital audio processor DSP process and make computational synthesis/modification algorithms of the digital audio file suitable for producing an electric piloting signal $S_P$ of the piezoelectric loudspeaker L, so as to reproduce the alarm audio signal F1.

In a second possible situation, for example, the check signal $S_{CHK}$ received by the micro controller MCU can consist of a signal coming from the electronic control unit C and suitable for indicating that the electric vehicle V is moving at a running speed below a maximum speed value (e.g., 30 km/h).

In such case, the sending means of the micro controller MCU send to the digital audio processor DSP a command signal $S_{COM}$ suitable for indicating that a proximity warning signal F2 has to be reproduced.

Consequently, the selection means of the digital audio processor DSP select and recover from the storage unit M the audio file corresponding to a proximity warning signal F2.

Subsequently, the processing means of the digital audio processor DSP process and make computational synthesis/modification algorithms of the digital audio file suitable for producing an electric piloting signal $S_P$ of the piezoelectric loudspeaker L, so as to reproduce the proximity warning signal F2.

Usefully, the computational synthesis/modification algorithms are able to change the reproduction of the audio file in real time according to the particular operating conditions, e.g., according to the speed of the electric vehicle V or of the battery charge level.

Usefully, the amplifier device A comprises at least a piloting circuit A1, preferably made up of a bridge H or of a similar electric circuit, connected downstream of the digital audio processor DSP and suitable for receiving at input the electric piloting signal $S_P$.

Preferably, the electric piloting signal $S_P$ is a PWM (Pulse-Width Modulation) type signal, i.e., a pulse width modulated signal.

The use cannot however be ruled out of different technologies for piloting the piezoelectric loudspeaker L.

The amplifier device A also comprises a voltage converter circuit, shown in FIG. 2 by the reference A2, connected at input to the power supply battery of the electric vehicle V and at output to the piloting circuit A1.

The voltage converter circuit A2 is suitable for producing at output a predefined continuous and constant power voltage starting from the voltage produced by the battery of the electric vehicle V or by a battery inside the system S.

In particular, the voltage converter circuit A2 can be made by means of a so-called boost converter (or step-up converter) and the predefined continuous and constant power voltage is determined according to the type of piezoelectric loudspeaker L used (e.g., it can be equal to 35V).

Usefully, the use of the voltage converter circuit A2 allows increasing the voltage at input to the piloting circuit A1 so as to obtain an adequate sound power level at output to the piezoelectric loudspeaker L, as well as maintaining such voltage constant irrespective of the battery charge level of the electric vehicle V.

The system S also comprises a filter LPF of the low-pass type, connected downstream of the piloting circuit A1 and upstream of the piezoelectric loudspeaker L.

The filter LPF is suitable for eliminating the distortion of the intrinsic voltage signal of piloting by means of bridge H and PWM modulation, by filtering the high-frequency spectral components of the piloting signal.

Preferably, the filter LPF is of the LC filter type or the like.

Figure 3:
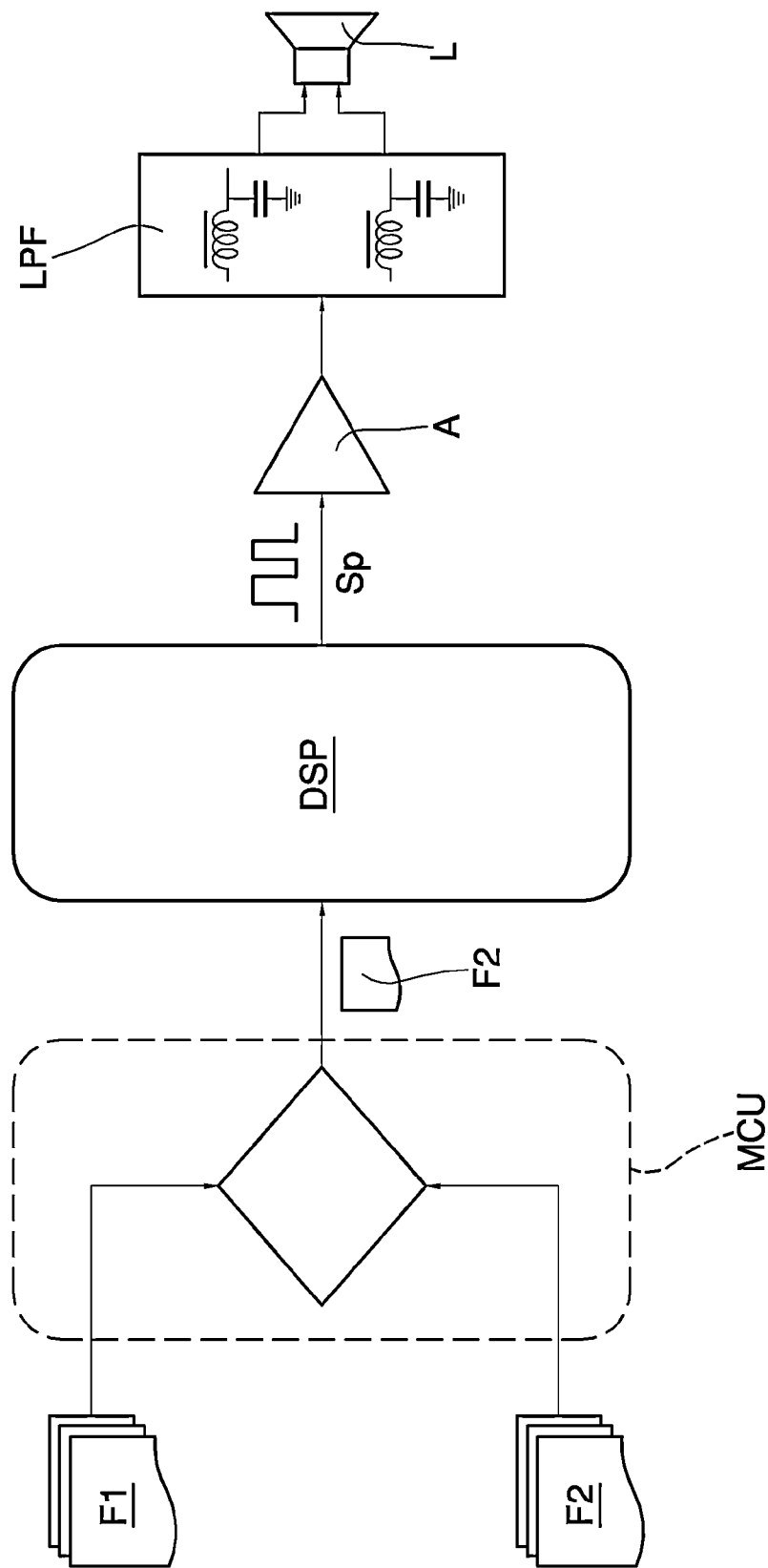
FIG. 3 is a functional diagram which schematically shows the acoustic signaling system according to the invention.

The operation of the system S is shown schematically in FIG. 3 and is described briefly here below.

Following the reception of one or more check signals $S_{CMK}$ from one of the control devices D and from the electronic control unit C, the micro controller MCU sends the digital audio processor DSP a command signal $S_{COM}$ suitable for indicating the type of file F1 or F2 which has to be reproduced.

For example, the check signal $S_{CHK}$ can come from the electronic control unit C and can indicate that the electric vehicle V is moving.

In such case, the micro controller MCU sends the digital audio processor DSP a command signal $S_{COM}$ suitable for indicating that a proximity warning signal F2 has to be reproduced.

The digital audio processor DSP selects and reads, from the storage unit M, the audio file corresponding to a proximity warning signal F2 and produces an electric piloting signal $S_P$ suitable for commanding the piloting circuit A1 and, consequently, the piezoelectric loudspeaker L, in order to reproduce the proximity warning signal.

In the case, instead, of the check signal $S_{CHK}$ received by/from the micro controller MCU consisting of an alarm signal, sent e.g. by one of the presence sensors D1, in case of undesired breaking into the interior compartment of the electric vehicle V, then the micro controller MCU sends the digital audio processor DSP a command signal $S_{COM}$ suitable for indicating that an alarm audio signal F1 has to be reproduced.

The digital audio processor selects and reads from the storage unit M the audio file corresponding to an alarm audio signal F1 and produces an electric piloting signal $S_P$ suitable for commanding the piloting circuit A1 and, consequently, the piezoelectric loudspeaker L so as to reproduce the alarm audio signal F1.

It has in practice been ascertained how the described invention achieves the proposed objects.

In particular, the fact is underlined that the acoustic signaling system according to the invention is able to effectively produce, by means of a single device, both a proximity signal of the vehicle and an alarm signal in case of an attempted theft/break in.

Compared to a conventional solution, wherein the presence is envisaged of a siren and of an acoustic signaling system which can be piloted by an anti-theft/anti-break in system and by a proximity signaling system of the vehicle respectively, the use of a single acoustic signaling system for both functions allows considerably cutting total intrinsic costs and installation times and complexity.

The invention claimed is:

1. Acoustic signaling system (S) for an electric or hybrid vehicle, which can be installed on the electric, comprising at least an amplifier device (A) of a piloting signal ($S_P$) and at least an electroacoustic transducer device (L) operatively connected to said amplifier device (A), comprising:
   at least a supervision unit (MCU) operatively connected to at least a control device (D) installed on said electric vehicle (V);
   at least a digital audio processor (DSP) operatively connected to said supervision unit (MCU) and to said amplifier device (A);
   wherein said supervision unit (MCU) has means for sending at least a command signal ($S_{COM}$) to said digital audio processor (DSP) according to at least a check signal ($S_{CHK}$) sent by said control device (D);
   wherein said digital audio processor (DSP) has selection means suitable for selecting one between at least two different audio files (F1, F2), according to said command signal ($S_{COM}$) received; and
   wherein said digital audio processor (DSP) has processing means suitable for producing said piloting signal ($S_P$) starting from said audio file (F1, F2) selected, and
   wherein said at least an audio file (F1, F2) is selected at least between:

at least a first audio file (F1) relative to an alarm audio signal suitable for signaling an attempted theft of said electric vehicle (V) and/or an attempted break-in inside said electric vehicle (V), when said electric vehicle (V) is stopped; and at least a second audio file (F2) relative to a proximity warning audio signal suitable for signaling an approach of said electric vehicle (V), when said electric vehicle (V) is running.

2. System (S) according to claim 1, wherein said at least an audio file (F1, F2) is selected among at least a sound signaling audio file suitable for signaling to a user of the electric vehicle (V) activation/deactivation of special functions of the vehicle itself.

3. System (S) according to claim 1, comprising at least a storage unit (M) suitable for storing said at least two different audio files (F1, F2).

4. System (S) according to claim 1, wherein said at least a control device (D) is selected among: a presence sensor (D1), a sensor for detecting a speed of said vehicle, a device for detecting a position of said vehicle, a sensor for detecting a start up of a motor of said electric vehicle (V), a disconnected battery sensor (D2), an inclination sensor (D3), an electronic control unit (C) of said electric vehicle (V).

5. System (S) according to claim 1, wherein said supervision unit (MCU) comprises at least a micro controller (MCU).

6. System (S) according to claim 1, wherein said amplifier device (A) comprises at least a bridge H (A1) suitable for receiving at input said piloting signal ($S_P$) and arranged upstream with respect to said electroacoustic transducer device (L).

7. System (S) according to claim 6, wherein said amplifier device (A) comprises at least a voltage converter circuit (A2), connected at input to a supply battery of said electric vehicle (V) and at output to said bridge H (A2), said voltage converter circuit (A2) being suitable for producing at output a predefined continuous and constant power voltage starting from the voltage produced by said battery.

8. System (S) according to the claim 7, wherein said voltage converter circuit (A2) comprises at least an electric circuit comprising a boost converter.

9. System (S) according to claim 6, comprising at least a low-pass filter (LPF) connected downstream of said bridge H (A1) and upstream of said electroacoustic transducer device (L).

10. System (S) according to claim 1, wherein said piloting signal ($S_P$) is a Pulse-Width Modulation signal.

11. System (S) according to claim 1, wherein said electroacoustic transducer device (L) comprises at least a piezoelectric loudspeaker (L).

12. Acoustic signaling system (S) for an electric or hybrid vehicle, which can be installed on the electric, comprising at least an amplifier device (A) of a piloting signal ($S_P$) and at least an electroacoustic transducer device (L) operatively connected to said amplifier device (A), comprising:

at least a supervision unit (MCU) operatively connected to at least a control device (D) installed on said electric vehicle (V);

at least a digital audio processor (DSP) operatively connected to said supervision unit (MCU) and to said amplifier device (A);

wherein said supervision unit (MCU) has means for sending at least a command signal ($S_{COM}$) to said digital audio processor (DSP) according to at least a check signal ($S_{CHK}$) sent by said control device (D);

wherein said digital audio processor (DSP) has selection means suitable for selecting one between at least two different audio files (F1, F2), according to said command signal ($S_{COM}$) received, and wherein said digital audio processor (DSP) has processing means suitable for producing said piloting signal ($S_P$) starting from said audio file (F1, F2) selected, wherein said amplifier device (A) comprises at least a bridge H (A1) suitable for receiving at input said piloting signal ($S_P$) and arranged upstream with respect to said electroacoustic transducer device (L), and wherein said amplifier device (A) comprises at least a voltage converter circuit (A2), connected at input to a supply battery of said electric vehicle (V) and at output to said bridge H (A2), said voltage converter circuit (A2) being suitable for producing at output a predefined continuous and constant power voltage starting from the voltage produced by said battery.

13. Acoustic signaling system (S) for an electric or hybrid vehicle, which can be installed on the electric, comprising at least an amplifier device (A) of a piloting signal ($S_P$) and at least an electroacoustic transducer device (L) operatively connected to said amplifier device (A), comprising:

at least a supervision unit (MCU) operatively connected to at least a control device (D) installed on said electric vehicle (V);

at least a digital audio processor (DSP) operatively connected to said supervision unit (MCU) and to said amplifier device (A);

wherein said supervision unit (MCU) has means for sending at least a command signal ($S_{COM}$) to said digital audio processor (DSP) according to at least a check signal ($S_{CHK}$) sent by said control device (D);

wherein said digital audio processor (DSP) has selection means suitable for selecting one between at least two different audio files (F1, F2), according to said command signal ($S_{COM}$) received, and wherein said digital audio processor (DSP) has processing means suitable for producing said piloting signal ($S_P$) starting from said audio file (F1, F2) selected, wherein said amplifier device (A) comprises at least a bridge H (A1) suitable for receiving at input said piloting signal ($S_P$) and arranged upstream with respect to said electroacoustic transducer device (L), and at least a low-pass filter (LPF) connected downstream of said bridge H (A1) and upstream of said electroacoustic transducer device (L).

* * * * *